United States Patent [19]

Suzuki

[11] Patent Number: 5,968,462
[45] Date of Patent: Oct. 19, 1999

[54] PROCESS FOR PURIFYING EXHAUST GASES

[75] Inventor: Hiromasa Suzuki, Kasugai, Japan

[73] Assignee: Toyota Jidosha Kabushiki Kaisha, Aichi-ken, Japan

[21] Appl. No.: 08/816,003

[22] Filed: Mar. 10, 1997

Related U.S. Application Data

[63] Continuation-in-part of application No. 08/379,215, Jan. 27, 1995, abandoned.

[30] Foreign Application Priority Data

Feb. 4, 1994 [JP] Japan ....................................... 6-12747

[51] Int. Cl.$^6$ ..................................................... B01D 53/94
[52] U.S. Cl. .................... 423/213.2; 423/212; 423/213.5
[58] Field of Search ................................ 423/213.2, 212, 423/213.5

[56] References Cited

U.S. PATENT DOCUMENTS

| | | | |
|---|---|---|---|
| 4,049,583 | 9/1977 | Lauder | 423/213.2 |
| 4,261,862 | 4/1981 | Kinoshita et al. | 423/213.5 |
| 5,008,090 | 4/1991 | Joy et al. | 423/212 |
| 5,075,275 | 12/1991 | Murakami et al. | 423/213.5 |
| 5,227,145 | 7/1993 | Kintaichi | 423/212 |
| 5,270,024 | 12/1993 | Kasahara | 423/213.2 |
| 5,427,989 | 6/1995 | Kanesaka | 423/213.5 |
| 5,433,933 | 7/1995 | Eshita | 423/213.2 |

FOREIGN PATENT DOCUMENTS

| | | |
|---|---|---|
| 0210 681 | 7/1985 | European Pat. Off. . |
| 315402 | 5/1989 | European Pat. Off. . |
| 540280 | 3/1993 | European Pat. Off. . |
| 0 540 280 A1 | 5/1993 | European Pat. Off. . |
| 0 573 672 A1 | 12/1993 | European Pat. Off. . |
| 0 580 389 A1 | 1/1994 | European Pat. Off. . |
| 0 597 106 A1 | 5/1994 | European Pat. Off. . |
| 0 598 916 A1 | 6/1994 | European Pat. Off. . |
| 666102 | 8/1995 | European Pat. Off. . |
| 43 19 294 | 5/1994 | Germany . |
| 62-117 620 | 5/1987 | Japan . |
| 01-135540 | 5/1989 | Japan . |
| 1-242 149 | 9/1989 | Japan . |
| 2-191 548 | 7/1990 | Japan . |
| 5-317652 | 3/1993 | Japan . |

OTHER PUBLICATIONS

Database WPI, Section Ch, Week 7344, Derwent Publication Ltd., London, GB, Class H06, AN 73–66285u & JP–a–48 055 190 (Hitachi–Maxell Ltd). (1973).

Patent Abstracts of Japan, vol. 014, No. 030 (C–678), Jan. 18, 1990 & JP–A–01 266851 (Res. Dev. Corp. Of Japan; others Oct. 24, 1989.

*Primary Examiner*—Wayne Langel
*Assistant Examiner*—Peter DiMauro
*Attorney, Agent, or Firm*—Oliff & Berridge, PLC

[57] ABSTRACT

A process includes the step of bringing exhaust gases into contact with a catalyst, wherein the catalyst includes a support including a porous substance, at least one $NO_x$ adsorbent loaded on the support, and selected from the group consisting of alkaline-earth metals, rare-earth elements and alkali metals, and at least one element loaded on the support, and selected from the group consisting of copper and cobalt. The process enables the catalyst to exhibit superb $NO_x$ purifying performance even after a durability test and to stably and efficiently purify $NO_x$ during the fuel-lean side (i.e., the oxygen-rich atmospheres) driving.

20 Claims, No Drawings

PROCESS FOR PURIFYING EXHAUST GASES

This is a continuation in part of application Ser. No. 08/379,215, filed Jan. 27, 1995, now abandoned.

BACKGROUND OF THE INVENTION

1. Field of Invention

The present invention relates to a process for purifying exhaust gases. More particularly, it relates to the process which can efficiently purify nitrogen oxides ($NO_x$) in the exhaust gases whose oxygen concentrations are at the stoichiometric point or more than required for oxidizing carbon monoxide (CO) and hydrocarbons (HC) therein.

2. Description of Related Art

As catalysts for purifying automotive exhaust gases, there have been employed 3-way catalysts so far which oxidize CO and HC and reduce $NO_x$ to purify the exhaust gases. For example, the 3-way catalysts have been known widely which comprise a heat resistant support formed of cordierite, a catalyst carrier layer formed of gamma-alumina and disposed on the support, and a noble metal catalyst ingredient selected from the group consisting of Pt, Pd and Rh and loaded on the catalyst carrier layer.

The purifying performance of the 3-way catalysts for purifying exhaust gases depends greatly on the air-fuel ratio A/F of automotive engine. For instance, when the air-fuel weight ratio is larger than 14.6, i.e., when the fuel concentration is low (or on the fuel-lean side), the oxygen concentration is high in exhaust gases. Accordingly, the oxidation reactions purifying CO and HC are active, but the reduction reactions purifying $NO_x$ are inactive. On the other hand, when the air-fuel ratio is smaller than 14.6, i.e., when the fuel concentration is higher (or on the fuel-rich side), the oxygen concentration is low in exhaust gases. Accordingly, the oxidation reactions are inactive, but the reduction reactions are active.

Moreover, when driving automobiles, especially when driving automobiles in urban areas, the automobiles are accelerated and decelerated frequently. Consequently, the air-fuel ratio varies frequently in the range of from the values adjacent to the stoichiometric point (or the theoretical air-fuel ratio: 14.6) to the fuel-rich side. In order to satisfy the low fuel consumption requirement during the driving conditions such as in the above-described urban areas, it is necessary to operate the automobiles on the fuel-lean side where the air-fuel mixture containing oxygen as excessive as possible is supplied to the engines. Hence, it has been desired to develop a catalyst which is capable of adequately purifying $NO_x$ even on the fuel-lean side (i.e., in the oxygen-rich atmospheres).

In view of the aforementioned circumstances, the applicant et al. of the present invention applied for a Japanese Patent for a novel catalyst under Japanese Patent Applicaton No. 4-130,904 (Japanese Unexamined Patent Publication (KOKAI) No. 5-317,652). On this catalyst, there are loaded an alkaline-earth metal oxide and Pt. In the catalyst, during the fuel-lean side (i.e., in the oxygen-rich atmospheres) driving, $NO_x$, which includes NO in an amount of about 90% by volume and the balance of $NO_2$ etc., is adsorbed on the alkaline-earth metal elements. For instance, the NO is oxidized to $NO_2$ by the Pt, and the resulting $NO_2$ is adsorbed on the alkaline-earth metal elements. When the air-fuel mixture varies from the stoichiometric point to the fuel-rich states, the adsorbed $NO_x$ is released from the alkaline-earth metal elements, and it is reacted with the reducing gas like HC by the action of the Pt. Thus, $NO_x$ is reduced and purified to $N_2$. As a result, the catalyst exhibits superb $NO_x$ purifying performance during the fuel-lean side (i.e., in the oxygen-rich atmospheres) driving.

The catalyst proposed in Japanese Unexamined Patent Publication (KOKAI) No. 5-317,652 is believed to provide the advantageous effect as follows: the alkaline-earth metal oxides, for example, barium oxide loaded on the support, react with $NO_x$ to produce nitrates, e.g., $Ba(NO_3)_2$. Thus, $NO_x$ is adsorbed on the support of the catalyst in the form of the alkaline-earth metal nitrates.

However, the exhaust gases usually contain $SO_2$ which is produced by burning sulfur (S) contained in the fuel. Further, the catalyst ingredient (e.g., Pt or the like) oxidizes $SO_2$ to $SO_3$ in the oxygen-rich atmospheres (i.e., on the fuel-lean side). Still further, $SO_3$ reacts readily with water vapor also contained in the exhaust gases to produce sulfuric acid. It has been revealed that the resulting sulfuric acid reacts with the alkaline-earth metal elements to produce alkaline-earth metal sulfites and alkaline-earth metal sulfates, thereby poisoning and degrading the alkaline-earth metal elements. Specifically, when the alkaline-earth metal elements are turned into the sulfites and sulfates, they hardly adsorb $NO_x$ thereon. As a result, the catalyst proposed in Japanese Unexamined Patent Publication (KOKAI) No. 5-317,652 might suffer from a drawback in that it is deteriorated in terms of the $NO_x$ purifying performance after it is subjected to a durability test.

SUMMARY OF THE INVENTION

The present invention has been developed in view of the aforementioned circumstances. It is therefore an object of the present invention to inhibit $NO_x$ adsorbents (e.g., alkaline-earth metals or the like) from being poisoned and degraded by sulfur, thereby purifying $NO_x$ efficiently in exhaust gases of oxygen-rich atmospheres even after a durability test.

In accordance with a first aspect of the present invention, there is proposed a process, which can carry out the aforementioned object, for purifying an exhaust gas by simultaneously removing carbon monoxide, hydrocarbons and nitrogen oxides contained in the exhaust gas, bringing the exhaust gas into contact with an exhaust gas purifying catalyst comprising:

a support including a porous substance;

at least one $NO_x$ adsorbent loaded on the support, and selected from the group consisting of alkaline-earth metals, rare-earth elements an alkali metals; and at least one element loaded on the support, and selected from the group consisting of copper and cobalt;

whereby the majority of the nitrogen oxides ($NO_x$) in the exhaust gas are adsorbed into the $NO_x$ adsorbent on the support under an oxygen-rich atmosphere in which oxidizing elements are excess of stoichiometric point which is required for oxidizing non-oxidizing elements in the exhaust gas, and the nitrogen oxides ($NO_x$) adsorbed into the $NO_x$ adsorbent on the support are released and purified by the reaction with the carbon monoxide and hydrocarbons in the exhaust gas under stoichiometric point air-fuel ratio or a fuel-rich atmosphere in which oxidizing elements are below stoichiometric point which is required for oxidizing non-oxidizing elements in the exhaust gas.

The exhaust gas purifying catalyst is preferably free of all platinum group components. In particular, the exhaust gas purifying catalyst is preferably free of platinum, palladium and rhodium.

Although the process according to the first aspect of the present invention may exhibit, compared to the process employing the catalyst disclosed in Japanese Unexamined Patent Publication (KOKAI) No. 5-317,652 and including Pt and alkaline-earth metal loaded thereon, low maximum $NO_x$ conversion in the fuel-lean side (i.e., in the oxygen-rich atmospheres) driving, it can exhibit $NO_x$ conversion less likely to deteriorate in the fuel-lean side (i.e., in the oxygen-rich atmospheres) driving even after the employed catalyst is subjected to a durability test. Thus, in accordance with the first aspect of the present invention, the present process can purify $NO_x$ for a long period of time. The advantageous effect is believed to be effected by the following mechanism.

Cu and Co have lower oxidation activity than Pt does. Accordingly, $SO_2$ is flowed to the downstream side without being oxidized. As a result, the $NO_x$ adsorbent little reacts with $SO_3$ to produce its sulfate, and can stably adsorb $NO_x$ thereon. Although the Cu and Co do not have oxidation activity as high as that of the Pt, they have oxidation activity which can oxidize NO, one of the major components of $NO_x$, to produce $NO_2$ which is likely to be adsorbed on the $NO_x$ adsorbent. In other words, NO is hardly adsorbed on the $NO_x$ adsorbent as it is, but, after it is oxidized to $NO_2$ by the Pt or the like, it can be adsorbed on the $NO_x$ at last. The Cu and Co have the oxidizing catalyst activity so that they carry out the reaction: $NO+O=NO_2$. Thus, $NO_x$ adsorbent can securely adsorb $NO_x$ thereon on the fuel-lean side. Then, in the running conditions of vehicle engine ranging from the driving at the stoichiometric point to the fuel-rich side (i.e., in the oxygen-lean atmospheres) driving, the $NO_x$ adsorbent releases $NO_x$ which has been adsorbed thereon in the fuel-lean side (i.e., in the oxygen-rich atmospheres) driving. The catalytic action of the Cu and Co reduces and purifies the thus released $NO_x$ to $N_2$, thereby reacting $NO_x$ with CO and HC in the exhaust gases and simultaneously oxidizing and purifying the CO and HC. By this type of mechanism, the $NO_x$ adsorbing ability of the employed catalyst can be kept for a prolonged period of time, and the high activity thereof can be maintained as well.

As for the porous substance, the following can be listed as examples: alumina, zeolite, zirconia, silica-alumina, silica and the combinations of them. These porous substances themselves can constitute a support, or they can be coated on a surface of a honeycomb body made from cordierite, heat resistant metal, etc.

As for a loading amount of the copper, it is preferable to load the copper in an amount of from 0.1 to 3.0 moles with respect to 1 liter of the support. As for a loading amount of the cobalt, it is preferable to load the cobalt in an amount of from 0.1 to 3.0 moles with respect to 1 liter of the support.

As for the $NO_x$ adsorbent, it is possible to employ at least one element selected from the group consisting of alkaline-earth metals, rare-earth elements and alkali metals. The alkaline-earth metal can be Ba, Sr, Ca and the like. The rare-earth element can be La, Y, Ce and the like. The alkali metal can be Li, K, Na and the like. Unless otherwise specified, the term, "rare-earth elements," herein includes not only the chemical elements with atomic numbers 58 through 71, but also $_{39}Y$ and $_{57}La$.

As for a loading amount of the $NO_x$ adsorbent, it is preferable to load the $NO_x$ adsorbent in an amount of from 0.1 to 1.0 mole, further preferably from 0.1 to 0.3 moles, with respect to 1 liter of the support.

In the present process according to the first aspect of the present invention, the Co may possibly react with the alumina or the $NO_x$ adsorbent at about 800° C. to produce certain compounds. When such compounds are produced, the Co as well as the $NO_x$ adsorbent may lose their inherent functions. Consequently, no improvement may possibly be expected in terms of the $NO_x$ conversion after a durability test.

In order to overcome this possible drawback, there is further proposed, in accordance with a second aspect of the present invention, a process, which can also carry out the aforementioned object, for purifying an exhaust gas by simultaneously removing carbon monoxide, hydrocarbons and nitrogen oxides contained in the exhaust gas, bringing the exhaust gas into contact with an exhaust gas purifying catalyst comprising:
 a cobalt-aluminate support wherein cobalt is dissolved in alumina; and
 at least one $NO_x$ adsorbent loaded on the cobalt-aluminate support, and selected from the group consisting of alkaline-earth metals, rare-earth elements and alkali metals;
 whereby the majority of the nitrogen oxides ($NO_x$) in the exhaust gas are adsorbed into the $NO_x$ adsorbent on the cobalt-aluminate support under an oxygen-rich atmosphere in which oxidizing elements are excess of stoichiometric point which is required for oxidizing non-oxidizing elements in the exhaust gas, and the nitrogen oxides ($NO_x$) adsorbed into the $NO_x$ adsorbent on the cobalt-aluminate support are released and purified by the reaction with the carbon monoxide and hydrocarbons in the exhaust gas under stoichiometric point air-fuel ratio or a fuel-rich atmosphere in which oxidizing elements are below stoichiometric point which is required for oxidizing non-oxidizing elements in the exhaust gas.

The exhaust gas purifying catalyst is preferably free of all platinum group components. In particular, the exhaust gas purifying catalyst is preferably free of platinum, palladium and rhodium.

The present process according to the second aspect of the present invention employs the catalyst which comprises the support including cobalt-aluminate with the $NO_x$ adsorbent (e.g., Ba etc.) loaded thereon. With this arrangement, when carrying out the present process, it is possible to inhibit the Co from reacting with the alumina in the employed catalyst and accordingly to inhibit the $NO_x$ conversion from deteriorating after a durability test.

Although one may foresee a possibility that the inherent catalytic action of the Co, for instance, its action of oxidizing NO in the exhaust gases and reducing the released $NO_2$ degrades on certain occasions, it is possible to avoid the possibility by controlling the dissolving amount of the Co. When the Co dissolving amount is thus controlled, it is possible to produce an advantageous effect which is equivalent to that produced by loading Co in the form of the simple substance. For example, it is preferable to dissolve the Co in the alumina in an amount of from 0.3 to 0.7 moles, further preferable in an amount of from 0.3 to 0.5 moles, with respect to 1 liter of the cobalt-aluminate support.

In addition, in accordance with the second aspect of the present invention, though reasons are still under investigation, the following advantageous effects are provided. That is, since the catalyst comprises the cobalt-aluminate support, the $NO_x$ adsorbent, such as Ba and the like, can be inhibited from reacting with the alumina, and accordingly its $NO_x$ adsorbing capability can be inhibited from degrading.

Likewise, in the second aspect of the present invention, the cobalt-aluminate itself can constitute a support, or it can be coated on a surface of a honeycomb body made from cordierite, heat resistant metal, etc.

Similarly, in the second aspect of the present invention, aforementioned specific alkaline-earth metals, rare-earth elements, alkali metals and the combinations thereof can constitute the $NO_x$ adsorbent. The $NO_x$ adsorbent is also preferably loaded in the amount of from 0.1 to 1.0 mole, further preferably from 0.1 to 0.3 moles, with respect to 1 liter of the cobalt-aluminate support.

Thus, in accordance with the first and second aspects of the present invention, the employed catalyst can be inhibited from suffering from the deterioration resulting from the $NO_x$ adsorbent which is poisoned and degraded by the sulfur contained in the exhaust gases. That is, the first and second aspects of the present invention enable the employed catalyst to exhibit superb $NO_x$ purifying performance even after a durability test and to stably and efficiently purify $NO_x$ during the fuel-lean side (i.e., oxygen-rich atmospheres) driving.

DETAILED DESCRIPTION OF PREFERRED EMBODIMENTS

Having generally described the present invention, a further understanding can be obtained by reference to the specific preferred embodiments which are provided herein for purposes of illustration only and are not intended to limit the scope of the appended claims.

The present invention will be hereinafter described in detail with reference to the preferred embodiments along with comparative examples. Unless otherwise specified, the term, "parts," hereinafter means "parts by weight."

First Preferred Embodiment (Preparation of Catalyst)

100 parts of an alumina powder, 70 parts of alumina sol containing alumina in an amount of 10% by weight, 15 parts of an alumina nitrate aqueous solution containing aluminum nitrate in an amount of 40% by weight, and 30 parts of water were mixed, thereby preparing a slurry for coating.

Then, a plurality of honeycomb supports formed of cordierite were immersed into the slurry, and thereafter each of them was blown to blow away the slurry in excess. After the blowing, each of the supports was dried at 80° C. for 20 minutes, and thereafter each of them was calcinated at 600° C. for 1 hour, thereby forming an alumina coating layer. The coating layer was thus coated on the honeycomb support in an amount of 120 grams with respect to 1 liter of the honeycomb support.

Each of the honeycomb supports having the coating layer was immersed into a copper nitrate aqueous solution, and each of them was blown to blow away the water droplets in excess. After the blowing, each of the supports was dried at 110° C., and thereafter each of them was calcinated at 600° C. for 1 hour, thereby loading Cu thereon. The loading amount of Cu was 0.1 mole, defined by moles of the metallic component, with respect to 120 grams of the alumina coating layer.

Then, each of the honeycomb supports with Cu loaded was immersed into a barium acetate aqueous solution having a predetermined concentration, and thereafter each of them was blown to blow away the water droplets in excess. After the blowing, each of them was dried at 110° C., and thereafter each of them was calcinated at 600° C. for 1 hour, thereby preparing catalysts identified with No. 1 in Table 1 below. The loading amount of Ba was 0.3 moles, defined by moles of the metallic component, with respect to 120 grams of the alumina coating layer.

Further, by following the same procedure as described above, two catalysts identified with Nos. 2 and 3 in Table 1 were prepared, on catalysts which Cu was loaded in an amount of 0.3 moles and 0.5 moles, defined by its metallic component, with respect to 120 grams of the alumina coating layer, respectively.

Furthermore, except that a cobalt acetate aqueous solution was used instead of the copper nitrate aqueous solution, another two catalysts identified with Nos. 4 and 5 in Table 1 were prepared in the aforementioned manner, on catalysts which Co was loaded in an amount of 0.1 mole an 0.3 moles, defined by its metallic component, with respect to 120 grams of the alumina coating layer, respectively. Ba was loaded on each of the catalysts in an identical amount.

Moreover, except that Sr, K and La substituted for the Ba, still another three catalysts identified with Nos. 6, 7 and 8 in Table 1 were prepared in the aforementioned manner, on catalysts which Co was loaded in the same amount as that of catalyst No. 5.

In addition, the following comparative examples were prepared:

except that a platinum dinitrodiammine aqueous solution was used instead of the copper nitrate aqueous solution, comparative catalysts identified with No. 9 in Table 1 were prepared in the same manner as catalyst No. 1, on comparative catalysts which Pt was loaded in an amount of 2.0 grams, defined by its metallic component, with respect to 120 grams of the alumina coating layer; and except that, after loading the Cu in the same manner as catalysts No. 1, a platinum dinitrodiammine aqueous solution was further used in the same manner as

TABLE 1

|  | Cu Loading Amount (mole/liter) | Co Loading Amount (mole/liter) | $NO_x$ Adsorbent Loading Amount (mole/liter) | | | | Pt Loading Amount (gram/liter) |
| --- | --- | --- | --- | --- | --- | --- | --- |
|  |  |  | Ba | Sr | K | La |  |
| Catalysts No. 1 | 0.1 | — | 0.3 | — | — | — | — |
| Catalysts No. 2 | 0.3 | — | 0.3 | — | — | — | — |
| Catalysts No. 3 | 0.5 | — | 0.3 | — | — | — | — |
| Catalysts No. 4 | — | 0.1 | 0.3 | — | — | — | — |
| Catalysts No. 5 | — | 0.3 | 0.3 | — | — | — | — |
| Catalysts No. 6 | 0.5 | 0.3 | — | 0.3 | — | — | — |
| Catalysts No. 7 | — | 0.3 | — | — | 0.3 | — | — |
| Catalysts No. 8 | — | 0.3 | — | — | — | 0.3 | — |
| Comp. Catalysts No. 9 | — | — | 0.3 | — | — | — | 2.0 |
| Comp. Catalysts No. 10 | 0.1 | — | 0.3 | — | — | — | 2.0 | comparative catalysts No. 9, comparative catalysts identified with No. 10 in Table 1 were prepared.

Note that, in comparative catalysts Nos. 9 and 10, the Ba was loaded in the same amount as those of catalysts Nos. 1 through 5.

Table 1 sets forth loaded metals and their loading amounts in catalysts Nos. 1 through 8 as well as in comparative catalysts Nos. 9 and 10.

Examination for Purifying Performance

Each of catalysts Nos. 1 through 8 as well as comparative catalysts Nos. 9 and 10, and a heat exchanger were disposed in an exhaust line of an actual vehicle equipped with a lean burn engine. The lean burn engine had a displacement of 1.6 liters. The vehicle was driven so as to vary the air-fuel mixture in a pulsating manner. For instance, the air-fuel mixture was varied alternatively from a fuel-lean state whose air-fuel ratio A/F was held at 20 for 2 minutes to a stoichiometric state whose air-fuel ratio A/F was held at 14.6 for 2 minutes. The exhaust gases were introduced into each of the catalysts at a temperature of from 200 to 500° C., and the $NO_x$ conversion was examined at intervals of 50° C.

After the aforementioned examination, each of catalysts Nos. 1 through 8 as well as comparative catalysts Nos. 9 and 10 was subjected to a bench test on durability which utilized the same type of engine as above. Namely, each of the catalysts was disposed in an exhaust line of the engine, and then the engine was run at an air-fuel ratio A/F of 18 for 50 hours while adjusting the temperature of the exhaust gas introduced into each of them at 650° C. After this bench test was over, each of the catalysts was again disposed in the exhaust line of the actual vehicle. The vehicle was driven in the same manner as described above, thereby examining the catalysts for the conversion of $NO_x$ after a durability test. In the bench test on durability, a fuel was used which contained sulfur in an amount of 70 ppm. The results of these examinations for the $NO_x$ conversion are summarized in Table 2 below. In Table 2, the initial $NO_x$ conversions are listed in the columns designated at "INC" (i.e., Initial $NO_x$ Conversion), the $NO_x$ conversions after the durability test are listed in the columns designated at "NCDT" (i.e., $NO_x$ Conversion after a Durability Test), and the values are expressed in %.

It is appreciated from Table 2 that, concerning the initial $NO_x$ conversion, the exhaust-gases-purifying process of the First Preferred Embodiment employing catalysts Nos. 1 through 8 was inferior to the comparative exhaust-gases-purifying process employing comparative catalysts Nos. 9 and 10. However, it is also understood from Table 2 that, concerning the deterioration of the $NO_x$ conversion after the durability test, the exhaust-gases-purifying process of the First Preferred Embodiment exhibited the $NO_x$ conversion, which was far less likely to deteriorate than the NOX conversion exhibited by the comparative exhaust-gases-purifying process, after the durability test. Thus, concerning the $NO_x$ conversion after the durability test, the exhaust-gases-purifying process of the First Preferred Embodiment was superior to the comparative exhaust-gases-purifying process.

Moreover, the temperature window was placed at higher-temperature sides by the exhaust-gases-purifying process of the First Preferred Embodiment than by the comparative exhaust-gases-purifying process. Accordingly, the exhaust-gases-purifying process of the First Preferred Embodiment enables to dispose an exhaust-gases-purifying catalyst directly below a vehicle engine. It has been difficult so far to dispose and use an exhaust-gases-purifying catalyst in such a manner.

TABLE 2

| | 200° C. | | 250° C. | | 300° C. | | 350° C. | | 400° C. | | 450° C. | | 500° C. | |
|---|---|---|---|---|---|---|---|---|---|---|---|---|---|---|
| | INC | NCDT | INC | NCDT | INC | NCDT | INC | NCDT | INC | NCDT | INC | NCDT | INC | NCDT |
| Catalysts No. 1 | — | — | 2 | 2 | 8 | 7 | 32 | 26 | 50 | 40 | 38 | 31 | 30 | 25 |
| Catalysts No. 2 | — | — | 5 | 5 | 16 | 14 | 40 | 31 | 60 | 51 | 48 | 42 | 33 | 28 |
| Catalysts No. 3 | — | — | 8 | 8 | 18 | 16 | 42 | 33 | 56 | 45 | 42 | 34 | 31 | 27 |
| Catalysts No. 4 | — | — | — | — | 2 | 0 | 20 | 12 | 40 | 30 | 51 | 46 | 46 | 39 |
| Catalysts No. 5 | — | — | — | — | 4 | 2 | 25 | 14 | 43 | 34 | 61 | 50 | 48 | 36 |
| Catalysts No. 6 | — | — | 3 | 1 | — | — | 22 | 11 | 40 | 30 | 58 | 49 | 46 | 34 |
| Catalysts No. 7 | — | — | 2 | — | — | — | 24 | 12 | 44 | 36 | 64 | 53 | 47 | 36 |
| Catalysts No. 8 | — | — | — | — | — | — | 18 | 9 | 36 | 24 | 50 | 41 | 40 | 30 |
| Comp. Catalysts No. 9 | 14 | 10 | 65 | 34 | 82 | 42 | 58 | 31 | 12 | 4 | — | — | — | — |
| Comp. Catalysts No. 10 | 12 | 8 | 66 | 32 | 86 | 43 | 60 | 32 | 18 | 8 | — | — | — | — |

(Note)
"INC" stands for Initial $NO_x$ Conversion.
"NCDT" stands for $NO_x$ Conversion after a Durability Test.

Second Preferred Embodiment

The honeycomb support having the alumina coating layer and prepared in the same manner as in the First Preferred Embodiment was also employed to produce catalysts to be employed by the exhaust-gases-purifying process of the Second Preferred Embodiment.

Each of the honeycomb supports having the alumina coating layer was immersed into a cobalt nitrate aqueous solutions having a predetermined concentration. After taking each of the supports out of the aqueous solution, each of them was blown to blow away the water droplets in excess. After the blowing, each of the supports was dried, and thereafter each of them was calcinated at 800° C. for 3 hours, thereby forming Co-aluminate in which Co was dissolved in the alumina-coating layer. Thus, a plurality of honeycomb supports were prepared which had the Co-aluminate thereon.

Then, each of the honeycomb supports having the Co-aluminate thereon was immersed into a barium acetate aqueous solution. After taking each of the supports out of the aqueous solution, each of them was blown to blow away the water droplets in excess. After the blowing, each of the supports was dried, and thereafter each of them was calcinated at 500° C. for 3 hours, thereby loading Ba thereon. Catalysts identified with Nos. 11 through 15 in Table 3 below were thus prepared. Table 3 also sets forth the loading amounts of Co and Ba on each of the catalysts.

Except that a potassium acetate aqueous solution was used instead of the barium acetate aqueous solution, catalysts identified with No. 16 in Table 3 were prepared in the same manner as the catalysts identified with Nos. 11 through 15. The loading amounts of Co and K are also set forth in Table 3.

Except that either Sr or La substituted for Ba, two kinds of catalysts identified with Nos. 17 and 18 in the engine was run for 50 hours at an air-fuel ratio A/F of 18 while adjusting the temperature of the exhaust gas introduced into each of the catalysts at 800° C. After this bench test was over, each of them was again disposed in the exhaust line of the actual vehicle. The vehicle was driven in the same manner as described above, thereby examining the catalysts for the conversion of HC, CO and $NO_x$ after a durability test. The results of the examination are also summarized in the columns designated at "Conversion after Durability Test" in Table 3. Note that, in the bench test on

TABLE 3

| | Co Loading Amount | $NO_x$ Adsorbrent Loading Amount (mole/liter) | | | | Initial Conversion (%) | | | Conversion after Durability Test (%) | | |
|---|---|---|---|---|---|---|---|---|---|---|---|
| | (mole/liter) | Ba | K | Sr | La | $NO_x$ | HC | CO | $NO_x$ | HC | CO |
| Catalysts No. 11 | 0.1 | 0.3 | — | — | — | 41 | 94 | 99 | 34 | 82 | 86 |
| Catalysts No. 12 | 0.3 | 0.3 | — | — | — | 65 | 96 | 100 | 57 | 88 | 90 |
| Catalysts No. 13 | 0.5 | 0.3 | — | — | — | 89 | 97 | 100 | 68 | 91 | 92 |
| Catalysts No. 14 | 0.7 | 0.3 | — | — | — | 78 | 98 | 100 | 62 | 94 | 93 |
| Catalysts No. 15 | 0.9 | 0.3 | — | — | — | 75 | 98 | 100 | 48 | 86 | 88 |
| Catalysts No. 16 | 0.5 | — | 0.3 | — | — | 67 | 94 | 100 | 60 | 84 | 90 |
| Catalysts No. 17 | 0.5 | — | — | 0.3 | — | 71 | 94 | 100 | 58 | 88 | 90 |
| Catalysts No. 18 | 0.5 | — | — | — | 0.3 | 65 | 99 | 100 | 52 | 94 | 96 |
| Comp. Catalysts No. 19 | 0.1 | 0.3 | — | — | — | 50 | 94 | 100 | 30 | 80 | 82 |
| Comp. Catalysts No. 20 | 0.3 | 0.3 | — | — | — | 72 | 96 | 100 | 42 | 81 | 88 |
| Comp. Catalysts No. 21 | 0.5 | 0.3 | — | — | — | 92 | 99 | 100 | 48 | 83 | 90 |

Table 3 were prepared in the same manner as the catalysts identified with Nos. 11 through 15. Note that the loading amount of Co was identical with that of the catalysts identified with No. 13.

Except that each of the honeycomb supports having the alumina coating layer was immersed into a cobalt nitrate aqueous solution, and that, after taking each of them out of the solution, blowing each of them to blow away water droplets in excess and drying each of them, each of them was calcinated at 500° C. for 3 hours, comparative catalysts identified with Nos. 19 through 21 which were free from the formation of Co-aluminate were produced in the same manner as the catalysts identified with Nos. 11 through 15. Note that the loading amounts of Co and Ba were identical with those of the catalysts identified with Nos. 11 through 13, respectively.

The comparative catalysts identified with Nos. 19 through 21 relate to the catalysts which are employed to carry out the process according to the first aspect of the present invention.

Examination for Purifying Performance

Each of catalysts Nos. 11 through 18 as well as comparative catalysts Nos. 19 through 21 was disposed in an exhaust line of an actual vehicle equipped with a lean burn engine. The lean burn engine had a displacement of 1.6 liters. The vehicle was driven in the urban area running mode, for instance, it was alternately driven in the 10-mode for a certain period of time and then the 15-mode for another certain period of time, thereby examining the catalysts for the conversion of HC, CO and $NO_x$. The results of the examination are also summarized in the columns designated at "Initial Conversion" in Table 3.

After the aforementioned examination, each of catalysts Nos. 11 through 18 as well as comparative catalysts Nos. 19 through 21 was subjected to a bench test on durability which utilized the same type of engine as above. Namely, each of them was disposed in an exhaust line of the engine, and then durability, a fuel was used which contained sulfur in an amount of 30 ppm.

It is apparent from Table 3 that the comparative exhaust-gases-purifying process employing comparative catalysts Nos. 19 through 21 was superior to the exhaust-gases-purifying process of the Second Preferred Embodiment employing the catalysts Nos. 11 through 18 in terms of the initial $NO_x$ conversion, but that the comparative exhaust-gases-purifying process exhibited the conversions deteriorated to large extent after the durability test. It is believed that, in comparative catalysts Nos. 19 through 21, the Co is caused to react with the alumina by the heat (800° C.) developed during the durability test, thereby producing compounds which degrade the Co in terms of its activity.

On the other hand, in the exhaust-gases-purifying process of the Second Preferred Embodiment employing the catalysts Nos. 11 through 18, the $NO_x$ conversion degraded less even after the durability test. In particular, in the exhaust-gases-purifying process of the Second Preferred Embodiment employing the catalysts whose Co dissolving amount fell in a range of from 0.3 to 0.7 moles with respect to 1 liter of the honeycomb support, the $NO_x$ conversion degraded least. Moreover, in the exhaust-gases-purifying process of the Second Preferred Embodiment, when the Co was loaded on the catalysts in an amount larger than that of the comparative catalysts Nos. 19 through 21, the initial $NO_x$ conversion was equivalent to that exhibited by the comparative exhaust-gases-purifying process employing the comparative catalysts.

Thus, even after the durability test, the $NO_x$ conversion can be apparently improved by including the Co in the form of Co-aluminate. This advantage is believed to be effected by inhibiting the $NO_x$ adsorbent from being poisoned and deteriorated by the sulfur.

Having now fully described the present invention, it will be apparent to one of ordinary skill in the art that many changes and modifications can be made thereto without departing from the spirit or scope of the present invention as set forth herein including the appended claims.

What is claimed is:

1. A process for purifying an exhaust gas, said process consisting of simultaneously removing carbon monoxide, hydrocarbons and nitrogen oxides contained in said gas by bringing said exhaust gas into contact with an exhaust gas purifying catalyst consisting of:

a support including a porous substance;

at least one $NO_x$ adsorbent loaded on the support, and selected from the group consisting of alkaline-earth metals, rare-earth elements and alkali metals; and at least one element loaded on the support, and selected from the group consisting of copper and cobalt;

wherein a majority of said nitrogen oxides ($NO_x$) in said exhaust gas are adsorbed to said $NO_x$ adsorbent on said support under an oxygen-rich atmosphere that exceeds an air-fuel ratio stoichiometric point, and the nitrogen oxides ($NO_x$) adsorbed to said $NO_x$ adsorbent on said support are released and purified by a reaction with said carbon monoxide and hydrocarbons in said exhaust gas catalyzed by said element loaded on the support under an atmosphere not higher than the stoichiometric point.

2. The process according to claim 1, wherein said porous substance is at least one member selected from the group consisting of alumina, zeolite, zirconia, silica-alumina, silica and combinations thereof.

3. The process according to claim 1, wherein said support is formed from at least one porous substance selected from the group consisting of alumina, zeolite, zirconia, silica-alumina, silica and combinations thereof.

4. The process according to claim 1, wherein said support is formed by coating at least one porous substance selected from the group consisting of alumina, zeolite, zirconia, silica-alumina, silica and combinations thereof on a surface of a honeycomb body which is made from at least one member selected from the group consisting of cordierite and heat resistant metal.

5. The process according to claim 1, wherein said copper is loaded on said support in an amount which is effective to purify carbon monoxide (CO), hydrocarbons (HC) and nitrogen oxide ($NO_x$) in exhaust gases whose oxygen concentrations are at the stoichiometric point or more than required for oxidizing CO and HC.

6. The process according to claim 5, wherein said copper is loaded on said support in an amount of from 0.1 to 3.0 moles of the copper with respect to 1 liter of the support.

7. The process according to claim 1, wherein said cobalt is loaded on said support in an amount which is effective to purify CO, HC and $NO_x$ in exhaust gases whose oxygen concentrations are at the stoichiometric point or more than required for oxidizing CO and HC.

8. The process according to claim 7, wherein said cobalt is loaded on said support in an amount of from 0.1 to 3.0 moles of the cobalt with respect to 1 liter of the support.

9. The process according to claim 1, wherein said step of bringing the exhaust gases into contact with the catalyst further includes the step of selecting at least one alkaline-earth metal from the group consisting of Ba, Sr and Ca as the $NO_x$ adsorbent.

10. The process according to claim 1, wherein said step of bringing the exhaust gases into contact with the catalyst further includes the step of selecting at least one rare-earth element from the group consisting of La, Y and Ce as the $NO_x$ adsorbent.

11. The process according to claim 1, wherein said step of bringing the exhaust gases into contact with the catalyst further includes the step of selecting at least one alkali metal from the group consisting of Li, K and Na as the $NO_x$ adsorbent.

12. The process according to claim 1, wherein said $NO_x$ adsorbent is loaded on said support in an amount of from 0.1 to 1.0 mole of the $NO_x$ adsorbent with respect to 1 liter of the support.

13. The process according to claim 12, wherein said $NO_x$ adsorbent is loaded on said support in an amount of from 0.1 to 0.3 mole of the $NO_x$ adsorbent with respect to 1 liter of the support.

14. A process for purifying an exhaust gas, said process comprising simultaneously removing carbon monoxide, hydrocarbons and nitrogen oxides contained in said exhaust gas by bringing said exhaust gas into contact with an exhaust gas purifying catalyst consisting of:

a support comprising a solid solution comprising cobalt and alumina, wherein cobalt is present in an amount of 0.3 to 0.7 moles of cobalt with respect to 1 liter of the support; and at least one $NO_x$ adsorbent loaded on the support, and selected from the group consisting of alkaline-earth metals, rare-earth elements and alkali metals;

wherein a majority of said nitrogen oxides ($NO_x$) in said exhaust gas are adsorbed to said $NO_x$ adsorbent on said support under an oxygen-rich atmosphere that exceeds an air-fuel ratio stoichiometric point, and the nitrogen oxides ($NO_x$) adsorbed to said $NO_x$ adsorbent on said support are released and purified by a reaction with said carbon monoxide and hydrocarbons in said exhaust gas catalyzed by cobalt of said support under an atmosphere not higher than the stoichiometric point.

15. The process according to claim 14, wherein said support comprises 0.3 to 0.5 moles of cobalt with respect to 1 liter of the support.

16. The process according to claim 14, wherein said step of bringing the exhaust gases into contact with the catalyst further includes the step of selecting at least one alkaline-earth metal from the group consisting of Ba, Sr and Ca as the $NO_x$ adsorbent.

17. The process according to claim 14, wherein said step of bringing the exhaust gases into contact with the catalyst further includes the step of selecting at least one rare-earth element from the group consisting of La, Y and Ce as the $NO_x$ adsorbent.

18. The process according to claim 14, wherein said step of bringing the exhaust gases into contact with the catalyst further includes the step of selecting at least one alkali metal from the group consisting of Li, K and Na as the $NO_x$ adsorbent.

19. The process according to claim 14, wherein said $NO_x$ adsorbent is loaded on said support in an amount of from 0.1 to 1.0 mole of the $NO_x$ adsorbent with respect to 1 liter of the support.

20. The process according to claim 19, wherein said $NO_x$ adsorbent is loaded on said support in an amount of from 0.1 to 0.3 mole of the $NO_x$ adsorbent with respect to 1 liter of the support.

* * * * *